United States Patent
Chen et al.

(10) Patent No.: US 7,602,714 B2
(45) Date of Patent: Oct. 13, 2009

(54) METHODS FOR MANAGING DATA TRANSMISSION BETWEEN AT LEAST TWO DIFFERENT DATA REGIONS

(75) Inventors: Jiangnan J. Chen, Hawthorn Woods, IL (US); Yuda Y. Luz, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 717 days.

(21) Appl. No.: 11/026,923

(22) Filed: Dec. 30, 2004

(65) Prior Publication Data

US 2006/0146750 A1    Jul. 6, 2006

(51) Int. Cl.
H04L 12/26    (2006.01)
H04Q 7/00    (2006.01)

(52) U.S. Cl. .................. 370/232; 370/333

(58) Field of Classification Search ........... 370/232, 370/310, 333, 335, 342, 441
See application file for complete search history.

(56) References Cited

U.S. PATENT DOCUMENTS

| | | | |
|---|---|---|---|
| 5,920,545 A * | 7/1999 | Rasanen et al. ........... 370/232 |
| 6,131,049 A * | 10/2000 | Marsan et al. ............. 455/574 |
| 6,278,701 B1 | 8/2001 | Ayyagari et al. |
| RE37,669 E * | 4/2002 | Kawano ..................... 455/436 |
| 6,389,066 B1 * | 5/2002 | Ejzak ......................... 375/224 |
| 6,526,028 B1 | 2/2003 | Kondo |
| 6,628,639 B1 * | 9/2003 | Ishii ........................... 370/346 |
| 6,714,511 B1 * | 3/2004 | Sudo et al. ................. 370/208 |
| 6,744,814 B1 * | 6/2004 | Blanksby et al. ........... 375/232 |
| 6,757,265 B1 * | 6/2004 | Sebastian et al. .......... 370/319 |
| 6,968,212 B1 * | 11/2005 | Aoyama et al. ......... 455/562.1 |
| 7,355,997 B2 * | 4/2008 | Qian et al. ................. 370/328 |
| 2003/0123396 A1 * | 7/2003 | Seo et al. ................... 370/252 |
| 2005/0232348 A1 * | 10/2005 | Chang ....................... 375/233 |

* cited by examiner

Primary Examiner—Hong Cho (57) ABSTRACT

In the present technique of data transmission management provided, a composite status indicator value is assessed (716) based on multiple channel quality indicator reports over a predefined time. The assessed composite status indicator value is compared (718) to a first threshold value. If the assessed composite status indicator value does not correspond in at least a predetermined way to the first threshold value, the mobile station is classified (720) in a high speed data region. Otherwise, the assessed composite status indicator value is further compared (726) to a second threshold, and if it corresponds in at least a predetermined way to the second threshold, the mobile station is classified (734) in the low speed data region.

15 Claims, 8 Drawing Sheets

METHODS FOR MANAGING DATA TRANSMISSION BETWEEN AT LEAST TWO DIFFERENT DATA REGIONS

TECHNICAL FIELD

This invention relates generally to a management process for data transmission between at least two different data regions.

BACKGROUND

With the recent introduction of high speed data into existing cellular network systems, such as Code Division Multiple Access ("CDMA") 2000 and Wideband CDMA ("WCDMA"), two different data channels, specifically a high speed shared data channel and a low speed non-shared data channel, are available to mobile stations ("MSs"). As a result, the existing coding of the low speed data, using codes such as Walsh/Orthogonal Variable Spreading Factor ("OVSF") codes, became shared resources between the low speed data and the high speed data.

These two data channels, however, consist of two very different data speed throughputs. Specifically, as an example, the high speed shared data channel (e.g., R5 of the Third Generation Partnership Project ("3GPP")) can offer higher data speeds of up to 14 megabits per second ("mbps") per user, while the low speed non-shared data channel (e.g., R99 of the 3GPP) offers only 384 kilobits per second ("kbps"). This discrepancy, however, is not efficiently accounted for because there is no defined partitioning guidance to transmit to the mobile station between the high speed shared data channel and the low speed non-shared data channel. Basically, where the same frequency carrier is shared between the two standards, the same OVSF resource is partitioned between the two services without any partitioning structure that accounts for the differences between the two standards.

Furthermore, since OVSF codes are typically allocated based on a code tree, a clearly cut boundary must be made during the transmission. This, however, greatly limits the high speed shared data channel's ability to manage its throughput because no mixed allocation guidance of the low speed data and the high speed data is available. As a result, as the code resource is limited in bandwidth, the inability to properly mix the allocation of the partitioned OVSF codes becomes a critical limiting factor when the high speed shared data channel is deciding to either maximize the number of users or to increase the peak user data rate. Thus, an inefficient code usage results between the two standards.

Moreover, since high speed data are shared on the high speed shared data channel, the shared channel scheduler will typically focus on the four best received users while other users may not be served for an extended period of time. As a result, some users fall between the cracks and are ignored unnecessarily because the scheduler fails to provide a loading pressure balance between the high speed data applications and the low speed data applications. Thus, the usage of the OVSF code resources is again not maximized, resulting in an inefficient use of the OVSF code resources. These problems are further exacerbated by the fact that the schedulers of the two standards are located at different components of the system. For example, the shared channel scheduler of the high speed data (e.g., R5) of the 3GPP is located at the base station ("BS"), whereas the low speed data scheduler of the low speed data (e.g., R99) is located at the radio network controller ("RNC"). This is problematic given that the OVSF codes are shared as a common resource between the BS and the RNC and the BS has no control over the RNC.

BRIEF DESCRIPTION OF THE DRAWINGS

The above needs are at least partially met through provision of the management processes described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, a data transmission management process has been provided that assesses a composite status indicator value based on multiple channel quality indicator reports from the mobile station over a predefined time. The assessed composite status indicator value is then compared to a first threshold value. If the assessed composite status indicator value does not correspond in at least a predetermined way to the first threshold value, the mobile station is classified in a high speed data region. Otherwise, the assessed composite status indicator value is further compared to a second threshold, and if it corresponds in at least a predetermined way to the second threshold, the mobile station is classified in the low speed data region.

According to various embodiments, the classification of the mobile station in the high speed data region and low speed data region further includes a scheduling of the mobile station on a high speed shared data channel and a low speed non-shared data channel, respectively. The classification of the mobile station in the low speed data region further includes rescheduling of the mobile station to the low speed non-shared data channel, followed by a determination as to whether a high speed shared data channel deactivation message has been received. If so, the mobile station is assigned to the low speed non-shared data channel.

In another embodiment, the mobile station may be classified in a handover data region when the composite status indicator value does not correspond in at least the predetermined way to the second threshold. The classification in a handover data region further includes, in one embodiment, an initiation of a handover responsive to a handover message being received and a repeat of the assessment of the composite status indicator value. For a particular embodiment, other related information of the mobile station are also collected to assess the composite status indicator value, which includes, but are not limited to, a user averaged data throughput, an amount of data available in a user data buffer, a number of active users, and a length of time that user data stayed in the user data buffer. In another embodiment, prior to the assessment of the composite status indicator value, the mobile station is activated on a base station scheduler active user list responsive to a channel assignment message to set up the mobile station for the high speed shared data channel. As such, data packets for the mobile station are received on the high speed shared data channel, which also triggers the multiple channel quality indicator reports being received from the mobile station.

According to various embodiments, multiple channel quality indicator reports are received from the mobile station, and a composite status indicator value is assessed based on the multiple reports over a predefined time. A determination is made as to whether the assessed composite status indicator value corresponds to a threshold, and if so, another determination is made as to whether the composite status indicator value falls in the high speed data region for a predefined period of time. The mobile station is scheduled in the high speed shared data channel when the composite status indicator value falls in the high speed data region for the predefined period of time. This scheduling of the mobile station in the high speed shared data channel, in one embodiment, involves sending a request to make such scheduling and setting up the data channel upon determining that the request has been accepted. If, on the other hand, the request was not accepted, these reports from the mobile station are then substantially continuously monitored. In one embodiment, the multiple channel quality indicator reports are also substantially continuously monitored when the assessed composite status indicator value does not correspond to the threshold. In another embodiment, after a deactivation of the mobile station from the low speed non-shared data channel at a specified time, the mobile station is again rescheduled on the high speed shared data channel.

According to various teachings, another process is presented that determines whether a coding scheme of the low speed non-shared data channel is available responsive to a request to redirect the mobile station to the low speed non-shared data channel. An accept message is sent when the coding scheme is available, or otherwise, a message to indicate that the coding scheme is not available is sent. In a particular embodiment described, the sending of the accept message also includes a low speed data call message to be sent that redirects the mobile station to the low speed non-shared data channel. In one embodiment, after a request to be directed to the high speed shared data channel is received from the mobile station, another request is sent to set up the high speed shared data channel, which ultimately triggers the sending of data packets on the high speed shared data channel for the mobile station.

Through the embodiments of various teachings provided, an improved data transmission management of at least two data channels, specifically a high speed data region and a low speed data region according to one embodiment, has been provided. Users that are not in good channel conditions and/or are less favorable for high speed shared data channel scheduling are now dynamically moved to the low speed non-shared data channel that has code resources with high spreading gain and coding gain with appropriate power control. As a result, more code resources are allocated for both high and low speed data applications because a more intelligent usage of the code resources properly balances the loading pressure between the two standards. As a result, fewer code resources are wasted due to the limitation of the coding scheme of the low speed data, resulting in higher total data throughput. Since the base station and radio network controller are adapted to work cooperatively, higher revenue stream for the network operators is also provided due to better utilization efficiency of the network equipment.

Disadvantaged users with channel conditions that are not favorable for scheduling to the high speed shared data channel are now more properly accommodated by both the shared channel scheduler and the low speed data scheduler. Thus, these disadvantaged users are now better served, resulting in an overall improved user experience and higher customer satisfaction. Moreover, because the complexity of the high speed scheduler has been reduced, the latencies of user requests of the high speed services are accordingly reduced. Lower bandwidth is now required for the scheduler task that normally resides in digital signal processing ("DSP") processors, which generally work under stringent timing budgets. Furthermore, since the shared channel scheduler is focusing more on the best channel condition users, it has less of a concern for user fairness. Users with unfavorable channel conditions will get a portion of the fat pipe by getting an underutilized low speed non-shared channel.

Figure 1:
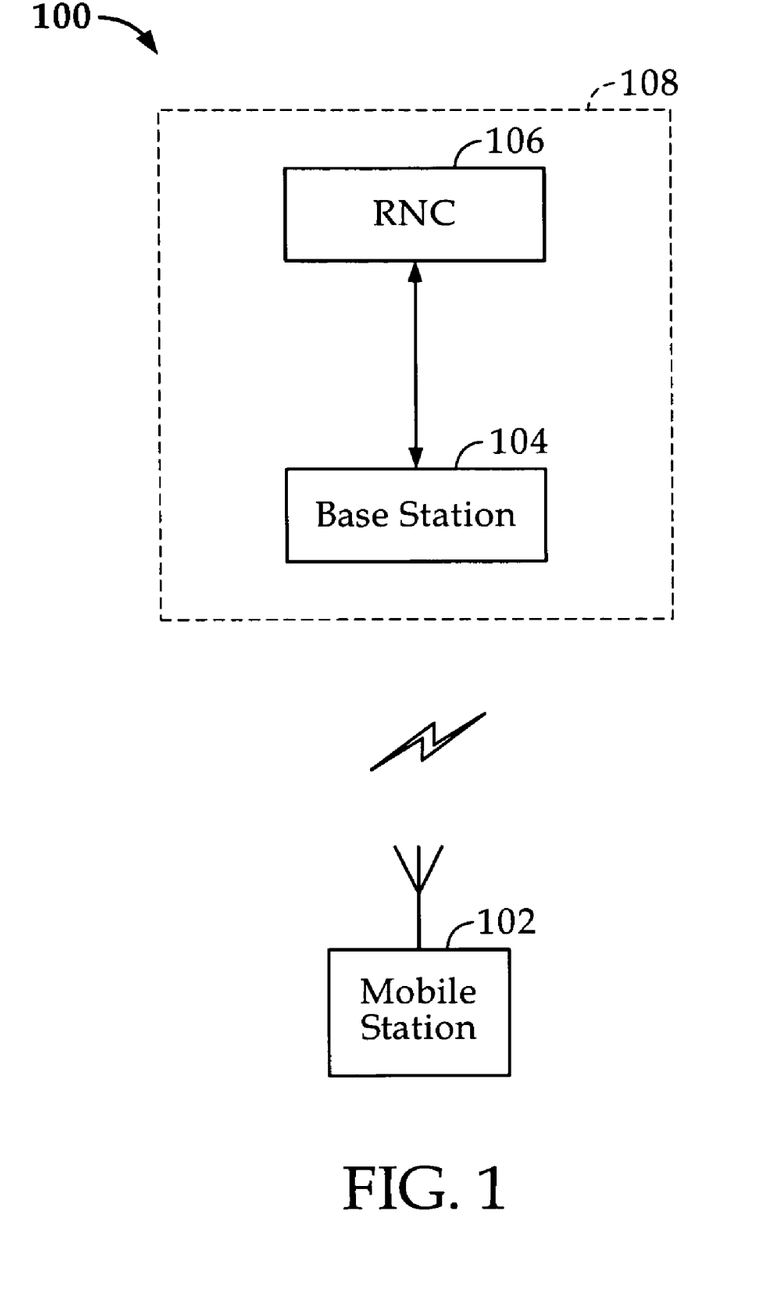
FIG. 1 comprises a block diagram of a typical wireless communication system suitable for various embodiments of the invention.

Referring now to the drawings, and in particular to FIG. 1, for purposes of providing an illustrative but non-exhaustive example to facilitate this description, a specific operational paradigm using a wireless communication network is shown and indicated generally at 100. Those skilled in the art, however, will recognize and appreciate that the specifics of this illustrative example are not specifics of the invention itself and that the teachings set forth herein are applicable in a variety of alternative settings. For example, since the various teachings are not platform dependent, they can be applied to any communication network that includes different types of data transmission. Thus, any digital broadcast services or digital satellite services may also applicable. These various platforms and network implementations are, as a result, within the scope of the invention, and various embodiments for these multiple implementations are readily understood and appreciated by one skilled in the art.

Pursuant to this example, a mobile station ("MS") 102 communicates with a base station ("BS") 104 that is operably coupled to a radio network controller ("RNC") 106. As commonly known in the art, the RNC 106 typically controls multiple BSs 104 (one shown) for data transmission between the MS 102 and the serving BS 104. In this example, typical of a general communication network, the MS 102 sends requests and/or data to the serving BS 104, which, in turn, forwards the requests and/or data to the RNC for processing. In the various teachings, the BS 104 and the RNC 106 cooperatively routes the MS 102 to a proper data channel. The various embodiments described contemplate data transmission that may be transitioned between two or more different data channels. For clarity and simplicity, a high speed shared data channel and a low speed non-shared data channel are used throughout the following description as one of the many embodiments, which are readily appreciated by one skilled in the art. As a result, the various teachings described are not limited to an implementation of only two types of data channels, and any implementations of more than two types of data channels are within the scope of the embodiments provided.

Furthermore, since current cell phones have many similar functions to that of computer devices, a mobile station will be herein used to refer to any device that transmit data through the network, which includes, but is not limited to, cell phones, personal digital assistants, and/or computers. Moreover, the BS 104 along with the RNC 106 will herein be referred to as a network controller 108 to emphasize that the various teachings described can be implemented fully or partially on either the BS 104 and/or the RNC 106. The communication system 100 shown is a typical exemplary structure of a cellular communication network that is suitable for various embodiments described.

Figure 2:
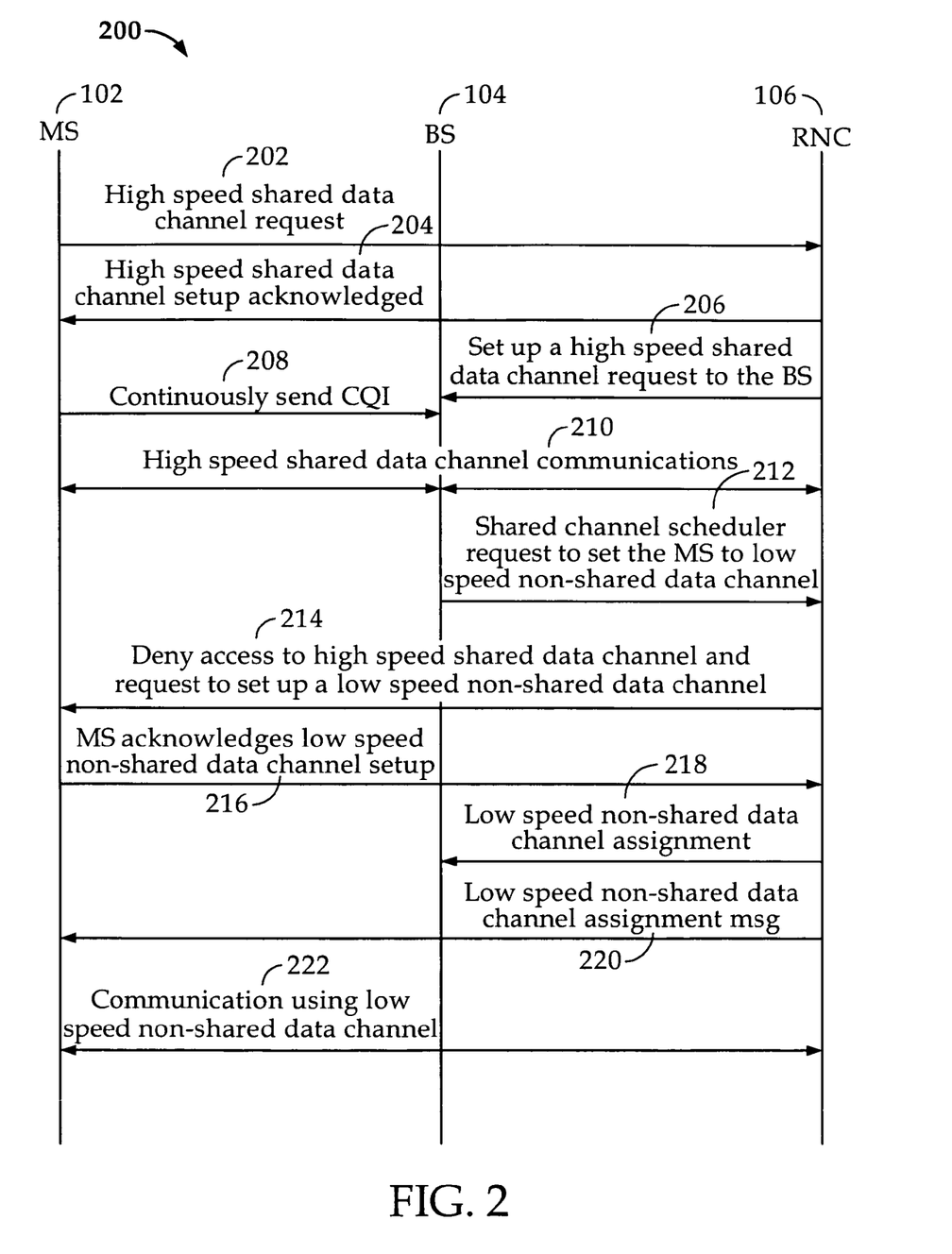
FIG. 2 comprises a call flow diagram of a high speed shared data channel request setup according to various embodiments of the invention.

Turning now to FIG. 2, a call flow diagram of a high speed shared data channel request setup according to various embodiments is shown and indicated generally at 200. In this call flow 200 as shown, the MS 102 sends 202 a high speed shared data channel request to the RNC 106, which responds 204 with a setup acknowledgment of the request to the MS. Responsive to the request from the MS 102, the RNC sends a setup request to the BS to effectuate communication of the MS 102 on the high speed shared data channel. At the same time, the MS continuously sends 208 channel quality indicator ("CQI") reports to the BS while the MS 102 is communicating 210 on the high speed shared data channel.

These reports allow the BS to keep track of the MS channel condition to determine whether the MS 102 should stay on the high speed shared data channel. Specifically, in one embodiment, a composite status indicator ("CSI") value is assessed using multiple CQI reports over a predefined period of time. If, at some point, the assessed CSI indicates that the MS is becoming inefficient on the high speed shared data channel, a shared channel scheduler at the BS 104 accordingly sends 212 a request to the RNC 106 to set up the MS 102 for low speed non-shared data channel. The RNC 106, in response, denies 214 access to the high speed shared data channel to the MS 102, followed by a request to the MS to instead set up communications on the low speed non-shared data channel. The MS 102, in response, acknowledges 216 the low speed non-shared data channel setup, and the RNC 106 accordingly sends 218, 220 a low speed non-shared data channel assignment to the BS 104 and a low speed non-shared channel assignment message to the MS 102. The MS 102 is now communicating 222 on the low speed non-shared data channel. The call flow shown is an example of how the MS 102 can be redirected from the high speed shared data channel to the low speed shared data channel.

Figure 3:
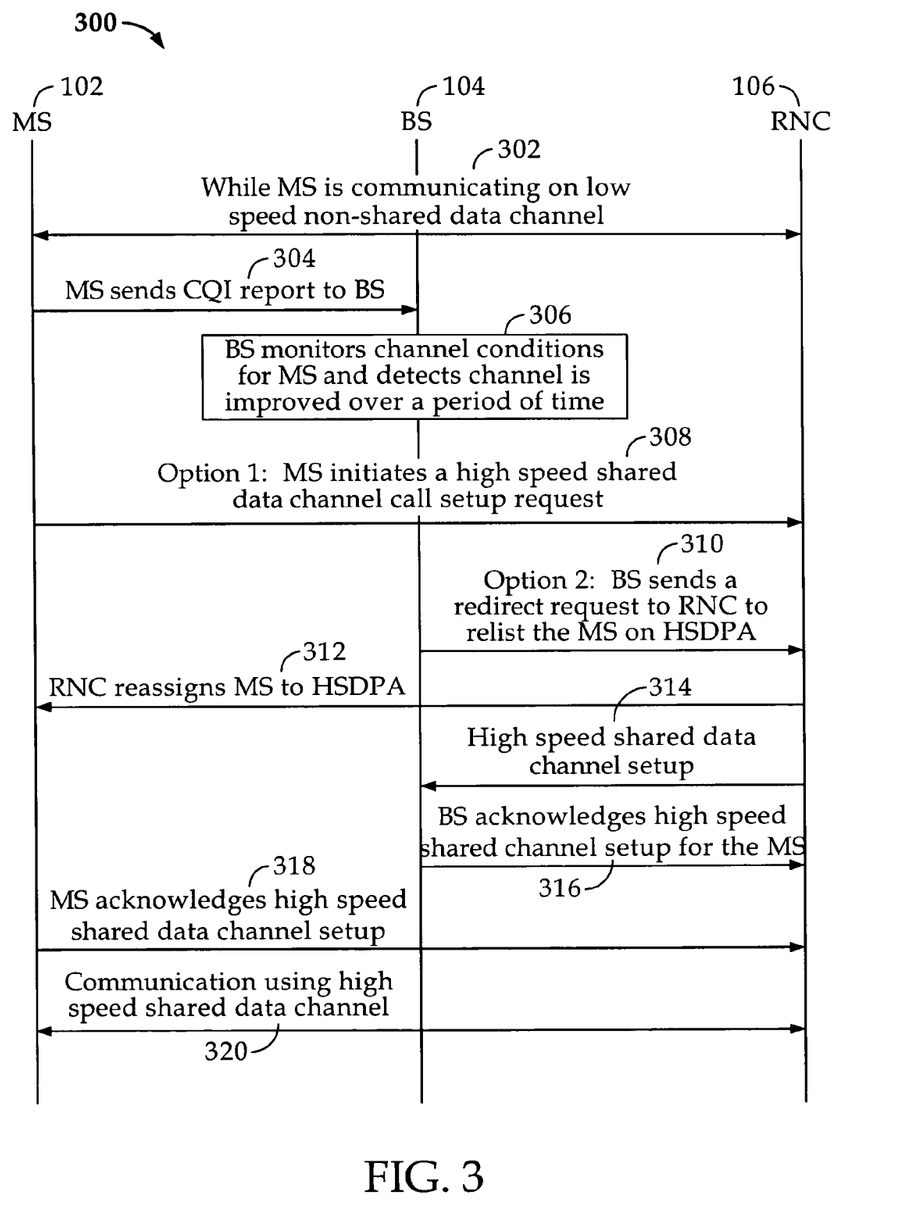
FIG. 3 comprises a call flow diagram of a low speed non-shared data channel data transmission according to various embodiments of the invention.

FIG. 3, on the other hand, is a call flow 300 diagram of how the MS 102 can be redirected from the low speed non-shared data channel to the high speed shared data channel. In particular, while the MS 102 is communicating 302 on the low speed non-shared data channel, the MS continuously sends 304 CQI reports to the BS that, in turn, monitors 306 the channel conditions of the MS to determine whether the channel condition has improved sufficiently over a period of time to makes it eligible for the high speed shared data channel. Specifically, there are at least two options that can redirect the MS 102 from low speed data to high speed data. A first option is when the MS itself initiates 308 a high speed shared data channel call setup request to the RNC. A second option is when the BS detects that the channel conditions of the MS 102 have improved sufficiently for a period of time, and the BS 104, in response, sends 310 a redirect request to the RNC to relist the MS on the High-Speed Downlink Packet Access ("HSDPA"). Accordingly, the RNC 106 reassigns 312 the mobile station to the HSDPA for communications on the high speed shared data channel. A high speed shared data channel setup is also sent 314 to the BS 104 to indicate the redirection of the channels. The BS 104 and the MS 102 accordingly acknowledge 316, 318 the setup of the high speed shared data channel. From this redirection, the MS will start communicating 320 on the high speed shared data channel. As shown, the BS 104 and the RNC work cooperatively to provide more intelligent assignments of the use of high and low speed data. As a result, the code resources are not unnecessarily wasted, resulting in a more efficient system.

Figure 4:
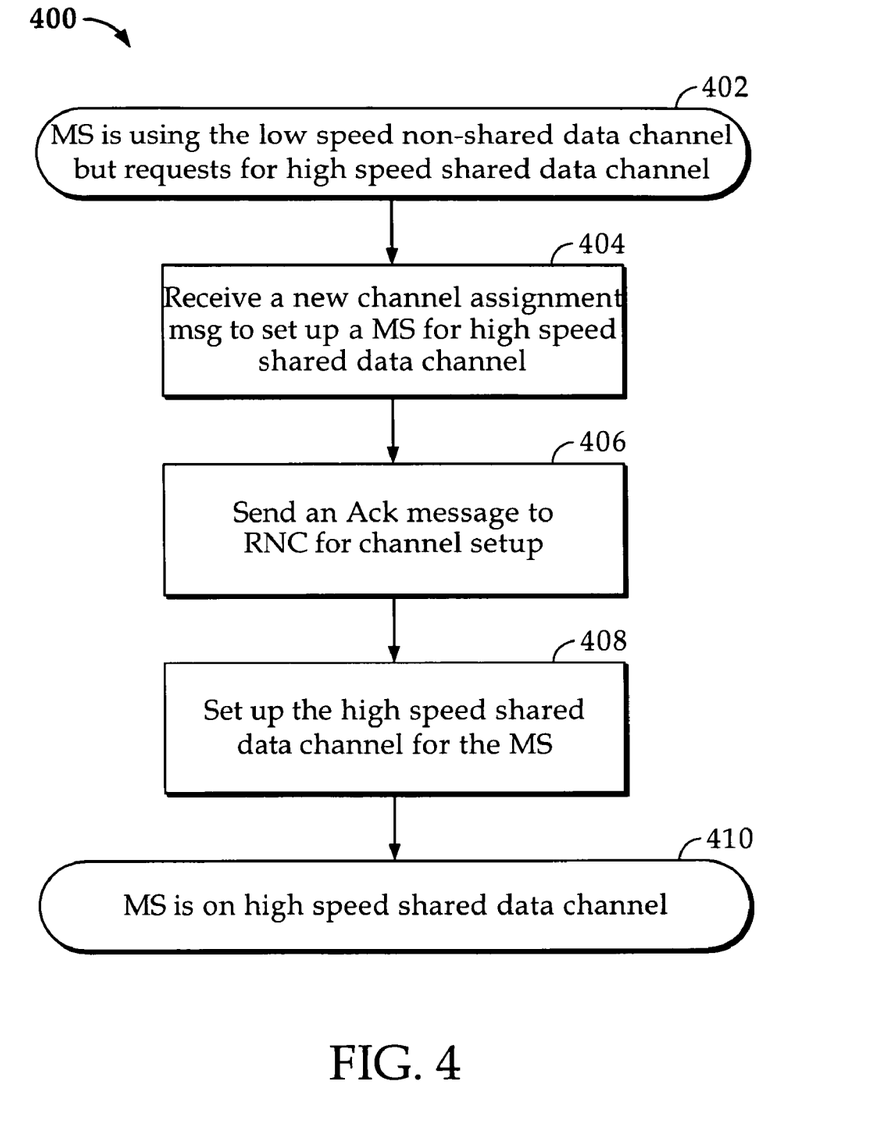
FIG. 4 comprises a flow chart diagram of a high speed data request process during a low speed data transmission according to an embodiment of the invention.

Referring now to FIG. 4, a flow chart diagram of a high speed data request process during a low speed data transmission according to an embodiment is shown and indicated generally at 400. These processes, as shown, can be implemented fully or partially at either the BS 104 and/or the RNC 106 or their equivalents. Moreover, as one skilled in the art can readily appreciate, any of the processes shown can be altered in multiple ways to achieve the same functions and results of the various teachings described. As a result, these processes shown are one exemplary embodiment of multiple variation embodiments that may not be specifically shown. These other embodiments, however, are also within the scope of the various teachings described.

In this particular example shown, the process 400 is initiated 402 with the MS requesting a change to the high speed shared data channel from the low speed non-shared data channel, which results in a new channel assignment message to be received 404 by the process for setting up the MS at the high speed shared data channel. Since the process shown may be implemented at the BS according to this embodiment, the decision to accept the MS's request has previously been granted by the RNC. As such, the BS simply sends 406 an acknowledgement message to the RNC to acknowledge the channel setup, and following the request, the high speed shared data channel is setup 408 for the MS. Communication on the high speed shared data channel is accordingly effectuated 410 for the MS.

Figure 5:
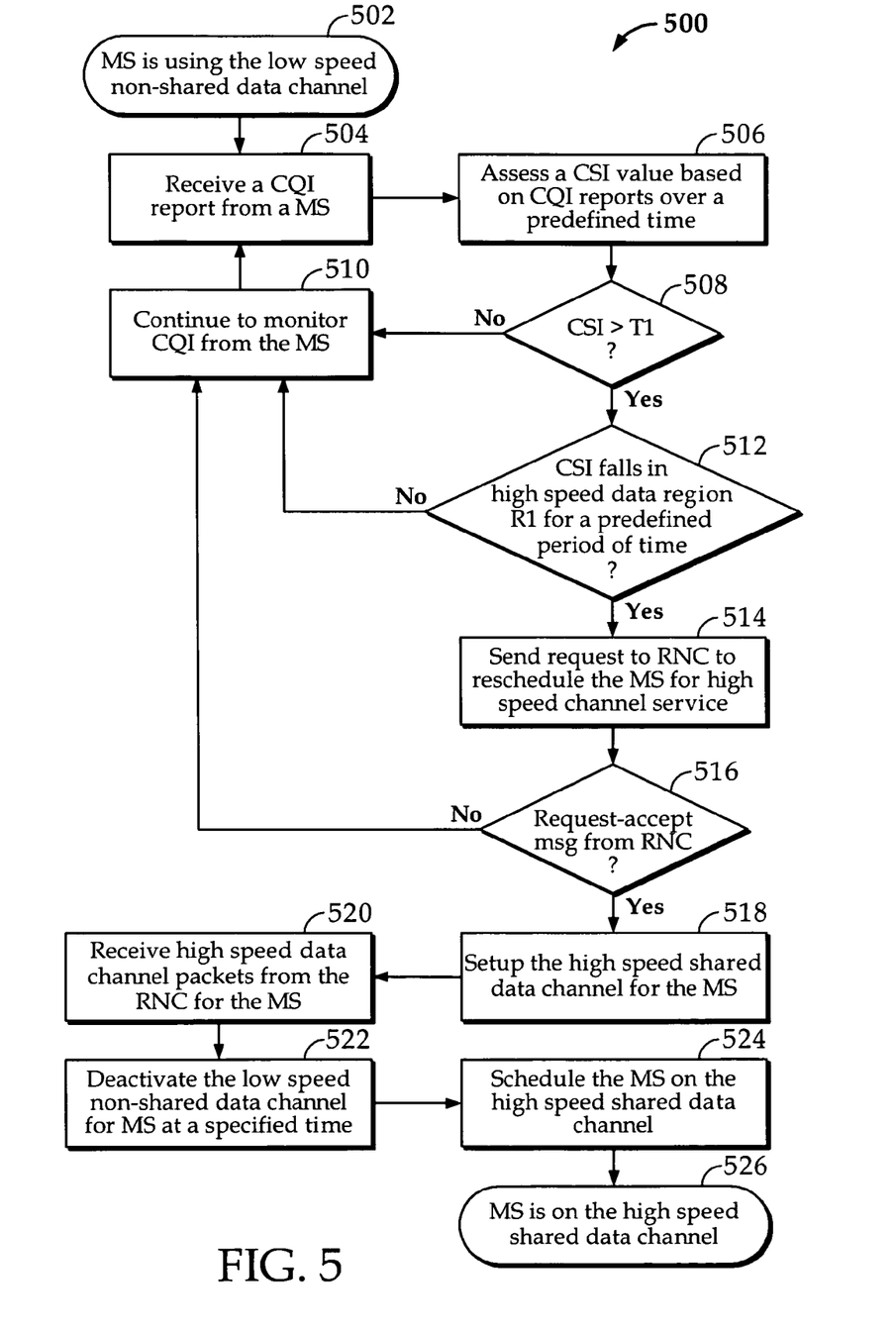
FIG. 5 comprises a flow chart diagram of reassignment process according to an embodiment of the invention.

Referring now to FIG. 5, a flow chart diagram of the reassignment process according to an embodiment is shown and indicated generally at 500. This process may also be implemented at the BS. Specifically, this process tracks the channel condition of the MS to determine whether a reassignment is needed. In this exemplary process shown, it is assumed that the MS is currently communicating on the low speed non-shared data channel, and the MS continuously sends CQI reports to the BS. To start 502, a CQI report from the MS is received 504 by the process, and responsive to the report, the CSI value 506 is assessed based on multiple CQI reports over a predefined period of time. The predefined period of time is included to ensure that the MS channel condition is stably improving. The CSI value is then compared to determine whether it corresponds at least in a predetermined way to a first threshold ("T1"); specifically in this embodiment shown, it is determined 508 whether the CSI value is greater than the first threshold. If not, the process continues to monitor 510 the CQI reports from the MS, and returns to waiting to receive 504 another CQI report.

If the CSI value, on the other hand, is greater than the first threshold, a further determination 512 is made as to whether the CSI value falls in the high speed data region ("R1") for a predefined period of time. Specifically, in one embodiment, it is determined whether the CSI value has been greater than the first threshold for the predefined period of time. If not, the process again goes back to continue monitoring 510 the CQI reports from the MS. If, however, the CSI value has been consistently greater than the first threshold for the predefined period of time, meaning that the channel condition of the MS has improved sufficiently to qualify for a high speed shared data channel, the process accordingly sends 514 a request to the RNC to reschedule the MS for high speed channel service.

The process then checks to determine 516 whether the RNC has in fact accepted the request by sending back a request accept message. If not, the process, as before, continues to monitor 510 the MS. Otherwise, when the process receives the request accept message from the RNC, the high speed shared data channel is set up 518 for the MS. High speed data channel packets for the MS are now received 520 from the RNC, and the low speed non-shared data channel is deactivated at a specified time. The MS is scheduled 524 by the shared channel scheduler for data transmission on the high speed shared data channel, which effectively causes the MS to now be on 526 the high speed shared data channel.

Figure 6:
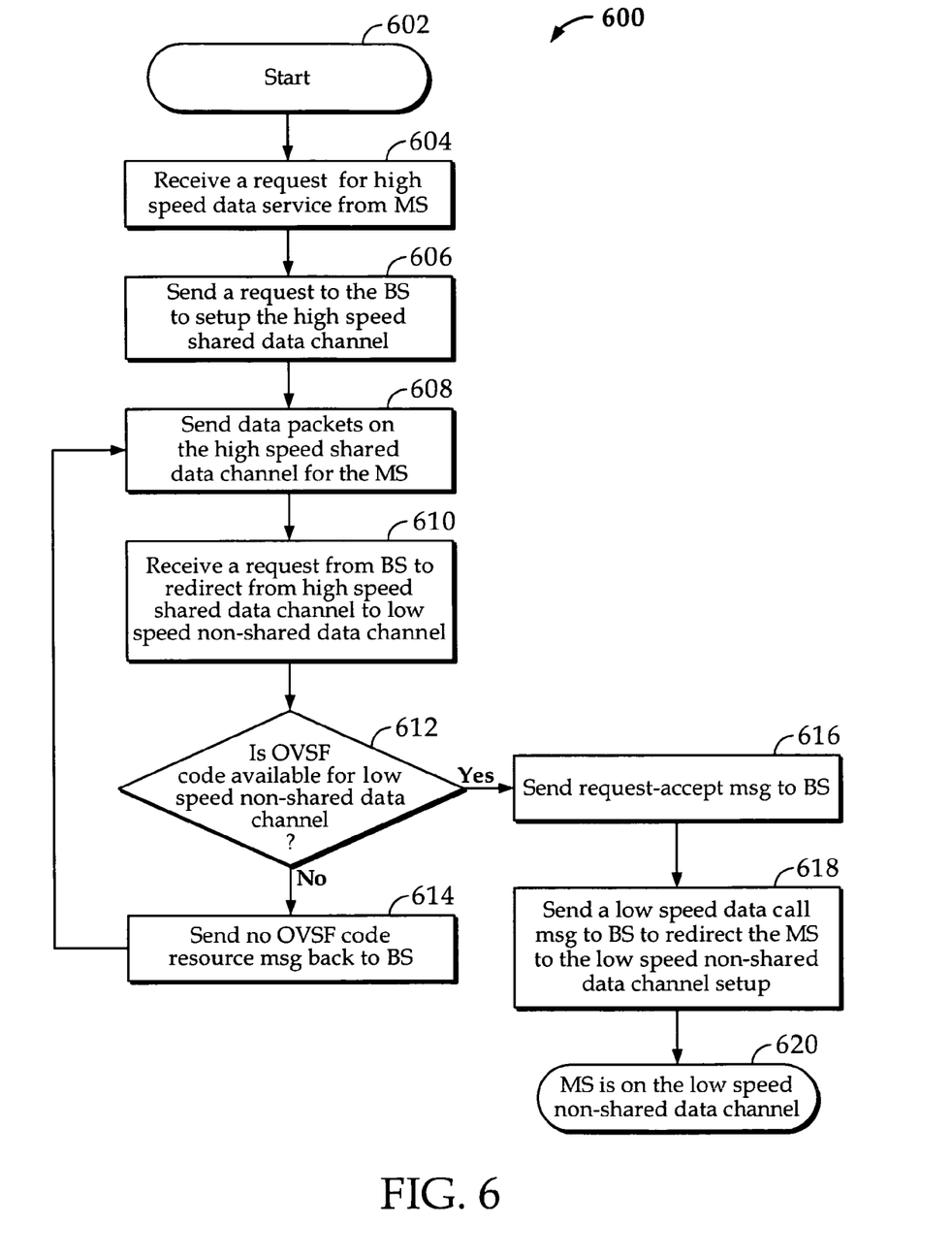
FIG. 6 comprises a flow chart diagram of a high speed data service request according to an embodiment of the invention.

Turning now to FIG. 6, a flow chart diagram of a high speed data service request according to an embodiment is shown and indicated generally at 600. This process relates to a request from the MS to be on the high speed data service. Specifically, for the embodiment shown, this process may be implemented on the RNC, which begins 602 with the process receiving 604 a request for high speed data service from the MS. The RNC, in response, sends 606 the request to the BS in order to properly setup the high speed shared data channel. From this point on, data packets for the MS will be transmitted 608 through the high speed shared data channel, at least until a request to redirect the MS to the low speed non-shared data channel is received 610. As described previously, the BS monitors the CQI reports to track the channel condition of the MS. As a result, the MS may eventually experience degraded channel conditions to the point that it no longer qualifies for high speed data transmission, which results in the BS sending the redirect request.

Upon the RNC receiving 610 the redirect request from the BS, the RNC determines 612 whether a low speed code resource, such as the OVSF code, is available for transmission on the low speed non-shared data channel. If not, the redirect request is denied and a message is sent 614 back to the BS to indicate that the OVSF code resource is unavailable, and the process reloops to continue data transmission 608 of the MS on the high speed shared data channel. If, however, the OVSF code is available, a request accept message is sent 616 to the BS followed by a low speed data call message being sent 618 to redirect the MS to the low speed non-shared data channel setup at the BS. As such, the MS is now redirected 620 from the high speed shared data channel to the low speed non-shared data channel.

Figure 7:
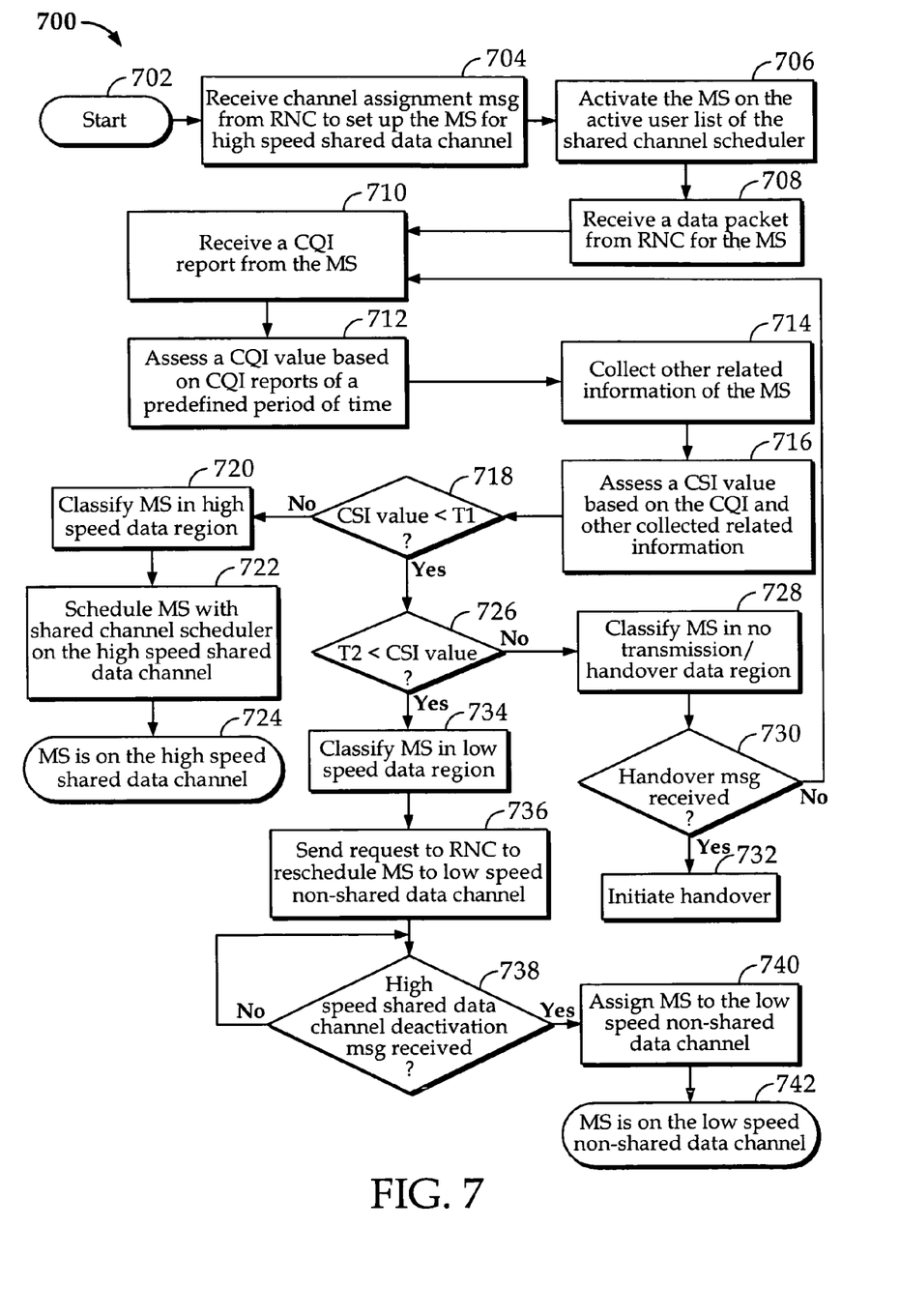
FIG. 7 comprises a flow chart diagram of a high speed data setup process according to an embodiment of the invention.

Turning now to FIG. 7, a flow chart diagram of a high speed data setup process according to an embodiment is shown and indicated generally at 700. This process shown relates an implementation on the BS to setup and monitor the two separate data channels. The process is initiated 702 with the receipt 704 of a channel assignment message from the RNC for setting up the MS on the high speed shared data channel, which activates 706 the MS on an active user list of the shared channel scheduler. Since the MS is now an active user of the high speed shared data channel, a data packet for the MS may be received 708 from the RNC for transmission, and as before, the MS continuously sends CQI reports to the BS while it is using high speed data. As a result, the BS would periodically receive 710 a CQI report from the MS. In this particular embodiment, a CQI value is first assessed 712 based on these reports over an extended period of time, and other related information of the MS, such as a user averaged data throughput, an amount of data available in a user data buffer, a number of active users, and a length of time that user data stayed in the user data buffer, may optionally be collected 714 to assess 716 the CSI value.

Once the CSI value is assessed, it is compared to determine 718 whether it corresponds in at least a predetermined way to the first threshold ("T1"); specifically in this embodiment, whether it is less than the first threshold. If not, meaning either the CSI value is equal to or greater than the first threshold, the MS would qualify in the high speed data region. The MS is accordingly classified 720 as such in the high speed data region, and the MS is scheduled 722 with the shared channel scheduler of the BS for access on the high speed shared data channel. The MS is, as a result, communicating 724 on the high speed shared data channel.

If, on the other hand, the CSI value is less than the first threshold, it is next determined 726 whether the CSI value corresponds to at least in a predetermined way to a second threshold ("T2"), specifically whether the CSI values is greater than the second threshold. If not, meaning the CSI value is less than both first and second thresholds, the MS is classified 728 in a no transmission or handover data region. The handover data region is a region where the channel condition can qualify for a handover to another serving BS. As such, the process determines 730 whether in fact such a handover message has been received from the MS, and if so, a handover is initiated 732, as is typically done in the prior art. If, however, a handover message has not been received from the MS, the process reloops back to substantially continuously tracking the channel condition of the MS by waiting until a next CQI report is received 710 to rerun the process from that point of the routine.

Now, for the case when the CSI is greater than the second threshold, which in this case means that the CSI value is between the first and second thresholds, the MS is classified 734 in the low speed data region. Accordingly, a request to reschedule the MS to the low speed non-shared data channel is sent 736 to the RNC. It is then determined 738 whether the high speed shared data channel deactivation message has been received from the RNC. If not, the process keeps checking for the deactivation message until such a message has been received. Upon the receipt of the deactivation message, the MS is assigned 740 to the low speed non-shared data channel, which effectively puts 742 the MS on the low speed non-shared data channel.

Figure 8:
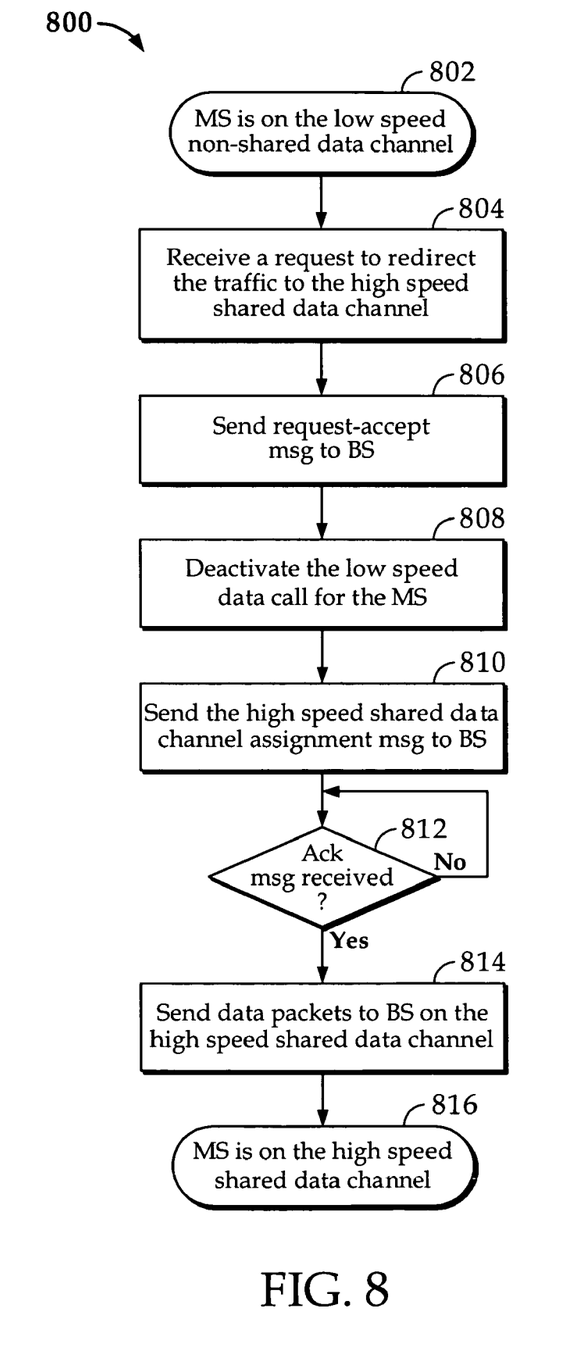
FIG. 8 comprises a flow chart diagram of a redirect process according to an embodiment of the invention.

Turning now to FIG. 8, a flow chart diagram of a redirect process according to an embodiment is shown and indicated generally at 800. This process may be implemented at the RNC as shown. In particular, this process relates to the RNC processing of a redirect request from the BS. In this example, it is assumed that the MS is currently on 802 the low speed non-shared data channel, and the BS is tracking the channel condition of the MS through CQI reports. Upon change(s) in the channel condition, the BS determines that the MS should be redirected to the high speed shared data channel and sends a request to the RNC. The RNC, in turn, receives 804 the request to redirect the traffic of the MS to the high speed shared data channel, and in response, responds 806 with a request accept message to the BS. The RNC further deactivates 808 the MS from the low speed data call, followed by a high speed shared data channel assignment message being sent 810 to the BS. It is next determined 812 whether an acknowledgement message of the assignment message has been sent from the BS. If not, the process keeps checking for the acknowledgement message until it is received. Once the acknowledgement message has been received, data packets for the MS will be sent 814 to the BS on the high speed shared data channel. As a result, the MS now communicates 816 using the high speed shared data channel.

With these various teachings shown, a data transmission management technique has been provided that efficiently accommodates the transition between at least two types of data channels, specifically a high speed data region and a low speed data region in one particular embodiment. Instead of being ignored as in the prior art, users of non-favorable channel conditions for high speed shared data channel are now dynamically moved to the low speed non-shared data channel that includes code resources with higher spreading gain and coding gain. Thus, better overall user experience and higher customer satisfaction are provided.

The code resources are also more efficiently used because more code resources are ultimately allocated for both high and low speed data applications. A more intelligent usage of these code resources has further been provided through these various teachings that properly balance the loading pressure of the two standards. Fewer code resources are now wasted due to the limitation of the coding scheme of being strictly in a tree code structure. Higher total data throughput along with higher revenue stream for network operators are attained due to better utilization efficiency of the network equipment from the BS and the RNC cooperative efforts. Since the complexity of the shared channel scheduler has been reduced, fewer requests for high speed services accordingly occur, which lowers the bandwidth needed for unnecessary scheduler tasks.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method of managing code resources for a data transmission of a mobile station between a high speed data region and a low speed data region comprising:
    assessing, at a base station, a composite status indicator value to provide an assessed composite status indicator value that is based on a plurality of channel quality indicator reports according to a predefined time;
    determining, at the base station, whether the assessed composite status indicator value corresponds in at least a predetermined way to a first threshold value;
    classifying, at the base station, the mobile station in a high speed data region when the assessed composite status indicator value does not correspond in at least the predetermined way to the first threshold value;
    determining, at the base station, whether the assessed composite status indicator value corresponds in at least a predetermined way to a second threshold value when the assessed composite status indicator value corresponds in at least the predetermined way to the first threshold value;
    classifying, at the base station, the mobile station in the low speed data region when the assessed composite status indicator value corresponds in at least the predetermined way to the second threshold value, and
    redirecting, at the base station, the mobile station from at least one of a shared data channel to a non-shared data channel and the non-shared data channel to the shared data region based on the assessed composite status indicator value to thereby manage the code resources for the data transmission.

2. The method according to claim 1 further comprising:
    classifying the mobile station in a handover data region when the assessed composite status indicator value does not correspond in at least the predetermined way to the second threshold value.

3. The method according to claim 2, wherein classifying the mobile station in the handover data region further comprises:
    determining whether a handover message has been received;
    initiating a handover of the mobile station when a handover message has been received;
    repeating assessing a composite status indicator value based on a plurality of channel quality indicator reports according to a predefined time when a handover message has not been received.

4. The method according to claim 1 further comprising, wherein prior to assessing the composite status indicator value:
    receiving a channel assignment message to set up the mobile station for a high speed shared data channel;
    activating the mobile station on a base station scheduler active user list;
    receiving data packets for the mobile station;
    receiving the plurality of channel quality indicator reports from the mobile station.

5. The method according to claim 1, wherein assessing a composite status indicator value based on a plurality of channel quality indicator reports according to a predefined time further comprises:
    collecting related information of the mobile station, wherein the assessed composite status indicator value is further based on collected related information.

6. The method according to claim 5, wherein the collected related information comprises any one or more selected from a group of a user averaged data throughput, an amount of data available in a user data buffer, a number of active users, and a length of time that user data stayed in the user data buffer.

7. The method according to claim 1, wherein classifying the mobile station in the high speed data region further comprises:
    scheduling the mobile station on a high speed shared data channel.

8. The method according to claim 1, wherein classifying the mobile station in the low speed data region further comprises:
    scheduling the mobile station on a low speed non-shared data channel.

9. The method according to claim 1, wherein classifying the mobile station in the low speed data region further comprises:
    rescheduling the mobile station to a low speed non-shared data channel;
    determining whether a high speed shared data channel deactivation message has been received;
    assigning the mobile station to the low speed non-shared data channel when the high speed shared data channel deactivation message has been received.

10. A method of managing data transmission of a mobile station between a high speed shared data channel defined in a high speed data region and a low speed non-shared data channel defined in a low speed data region comprising:
    receiving a plurality of channel quality indicator reports from the mobile station;

assessing a composite status indicator value based on the plurality of channel quality indicator reports according to a predefined time to provide an assessed composite status indicator value;

determining whether the assessed composite status indicator value corresponds in at least a predetermined way to a threshold;

determining whether the assessed composite status indicator value falls in the high speed data region for a predefined period of time when the assessed composite status indicator value corresponds in at least the predetermined way to the threshold; scheduling the mobile station in the high speed shared data channel when the assessed composite status indicator value falls in the high speed data region for the predefined period of time including sending a request to schedule the mobile station in the high speed shared data channel, determining whether the request has been accepted. setting up the high speed shared data channel for the mobile station when the request has been accepted and continuously monitoring the plurality of channel quality indicator reports from the mobile station when the request has not been accepted, and redirecting the mobile station from at least one of a shared data channel to a non-shared data channel and the non-shared data channel to the shared data region based on the assessed composite status indicator value.

11. The method according to claim 10 further comprising:
continuously monitoring the plurality of channel quality indicator reports from the mobile station when the assessed composite status indicator value does not correspond in at least the predetermined way to the threshold.

12. The method according to claim 10 further comprising:
receiving a high speed shared data channel packet for the mobile station;
deactivating the mobile station from the low speed non-shared data channel at a specified time;
rescheduling the mobile station on the high speed shared data channel.

13. A method of managing code resources for a data transmission of a mobile station between a shared data channel of a high speed data region and a non-shared data channel of a low speed data region comprising:
receiving a request to redirect the mobile station from the shared data channel of a high speed data region to the non-shared data channel of a low speed data region based on a assessed composite status indicator level;
determining whether a code resource for the non-shared data channel in the low speed data region is available
determining whether a coding scheme for the non-shared data channel in the low speed data region channel is available;
comparing the code scheme for the non-shared data channel of the low speed channel to the code scheme of the high speed data region;
sending an accept message to the request when the coding scheme of the non-shared data channel of the low speed data region is available;
sending a message to indicate that the coding scheme of the non-shared data channel of the low speed data region is unavailable when the coding scheme of the non-shared data channel of the low speed data region is not available.

14. The method according to claim 13 further comprising, wherein prior to receiving the request to redirect the mobile station from the high speed shared data channel to the low speed non-shared data channel:
receiving a request to be directed to the high speed shared data channel from the mobile station;
sending a request to set up the high speed shared data channel responsive to the request;
sending a data packet on the high speed shared data channel for the mobile station.

15. The method according to claim 13, wherein sending the accept message to the request further comprises:
sending a low speed data call message to redirect the mobile station to the low speed non-shared data channel.

* * * * *